United States Patent
Min

(10) Patent No.: US 12,134,438 B2
(45) Date of Patent: Nov. 5, 2024

(54) STEERING DEVICE OF INDEPENDENT DRIVE WHEEL AND INDEPENDENT DRIVE MODULE INCLUDING SAME

(71) Applicant: HYUNDAI MOBIS CO., LTD., Seoul (KR)

(72) Inventor: Kyongwon Min, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 594 days.

(21) Appl. No.: 17/458,785

(22) Filed: Aug. 27, 2021

(65) Prior Publication Data

US 2022/0073136 A1    Mar. 10, 2022

(30) Foreign Application Priority Data

Sep. 9, 2020  (KR) .......................... 10-2020-0115579

(51) Int. Cl.
*B62D 7/14*    (2006.01)
*B62D 5/04*    (2006.01)
*B62D 7/18*    (2006.01)

(52) U.S. Cl.
CPC ............. *B62D 7/14* (2013.01); *B62D 5/0418* (2013.01); *B62D 7/18* (2013.01)

(58) Field of Classification Search
CPC .......... B62D 7/14; B62D 5/0418; B62D 7/18
See application file for complete search history.

(56) References Cited

U.S. PATENT DOCUMENTS

| 6,675,925 B2 * | 1/2004 | Takahashi ............ B60K 17/303 |
|                |        | 180/343                            |
| 11,148,493 B2 * | 10/2021 | Riedel ...................... B60G 3/06 |
| 11,351,826 B2 * | 6/2022 | Riedel .................. B60K 7/0007 |
| 2005/0017472 A1 * | 1/2005 | Kondo .................... B62D 7/16 |
|                |        | 280/93.513                         |

(Continued)

FOREIGN PATENT DOCUMENTS

| CN | 101638052   | * | 8/2009 |
| CN | 101638052 A |   | 2/2010 |

(Continued)

OTHER PUBLICATIONS

Office Action issued on Mar. 29, 2023 in corresponding Chinese patent application No. 202111054273.0.

(Continued)

*Primary Examiner* — Kevin Hurley
*Assistant Examiner* — Michael R Stabley
(74) *Attorney, Agent, or Firm* — Novo TechIP International PLLC

(57) ABSTRACT

Provided is a steering device of an independent drive wheel, the steering device including a base frame coupled to a vehicle body; a drive device coupled to the base frame and driven to rotate an output shaft; a steering knuckle connecting the base frame and the wheel through an upper arm and a lower arm spaced apart from each other in the up/down direction; and a connecting device having one end connected to the output shaft of the drive device and the other end, which extends in the longitudinal direction, connected to a steering knuckle below the upper arm to transmit the driving force of a drive device to rotate the steering knuckle in the same direction as the extending longitudinal direction.

15 Claims, 10 Drawing Sheets

(56) References Cited

U.S. PATENT DOCUMENTS

2019/0329621 A1* 10/2019 Budweil ............... B62D 7/18
2020/0062064 A1*  2/2020 Riedel ............... B62D 5/0418
2020/0101806 A1*  4/2020 Riedel ............... B60G 3/06

FOREIGN PATENT DOCUMENTS

| CN | 102717696 A    |   | 10/2012 |
|----|----------------|---|---------|
| CN | 108791477 A    |   | 11/2018 |
| DE | 102012019797 A1| * | 1/2014  |
| DE | 102017106810 A1|   | 10/2018 |
| KR | 20190041855 A  |   | 4/2019  |
| WO | 2008128379 A1  |   | 10/2008 |
| WO | 2014101756 A1  |   | 7/2014  |

OTHER PUBLICATIONS

Extended European Search Report for corresponding European patent application No. 21195189.2 issued Feb. 3, 2022.

* cited by examiner

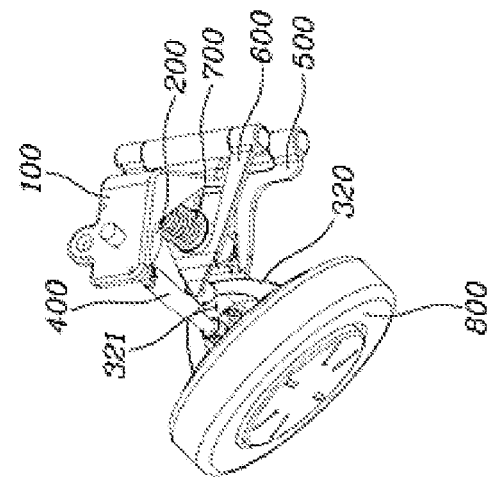
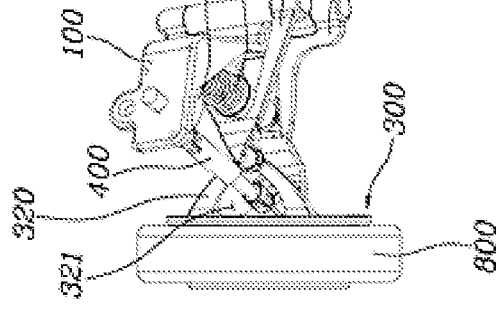
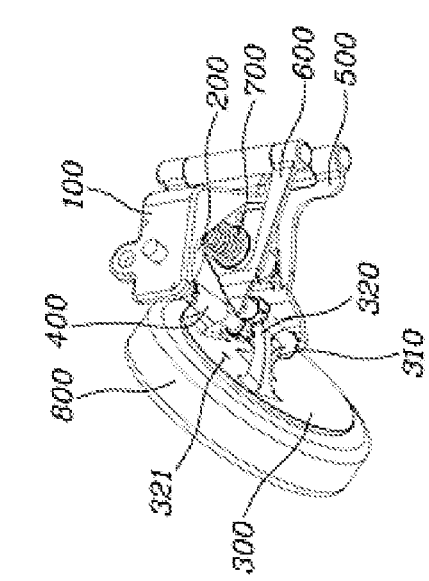

STEERING DEVICE OF INDEPENDENT DRIVE WHEEL AND INDEPENDENT DRIVE MODULE INCLUDING SAME

CROSS-REFERENCE TO RELATED APPLICATIONS

The present application claims priority to Korean Patent Application No. 10-2020-0115579, filed Sep. 9, 2020, the entire contents of which is incorporated herein for all purposes by this reference.

BACKGROUND OF THE INVENTION

1. Field of the Invention

The present invention relates to a steering device of independent drive wheels and an independent drive module including the same. More particularly, the present invention relates to a technique of installing a steering device to each independent drive wheel and independently steering the independent drive wheel.

2. Discussion of Related Art

An electric vehicle refers to an eco-friendly vehicle that does not emit exhaust gas at all and essentially includes a high-voltage battery supplying energy for driving, an inverter that converts direct current DC outputted from the high-voltage battery into alternating current AC, and a driving motor that receives alternating current from the inverter to generate rotational force to drive the vehicle, and the rotational force of the motor is reduced by a reducer and then transmitted to the wheel through the drive shaft to drive the electric vehicle.

Recently, the advantage that an intermediate power transmission device such as a reducer or a differential gear may be dispensed with so that vehicle weight and energy loss in the power transmission process may be reduced has spotlighted the in-wheel motor vehicle in which a motor is directly installed inside a rim of a wheel for tire mounting to enable direct transmission of the power of the motor to the wheel.

The conventional steering device of the in-wheel motor was mounted on the wheel at the same angle as the kingpin angle, which is the angle between the vertical line of the wheel and the extension line extending from the ends of the upper arm and the lower arm to the wheel tread, to minimize the steering torque such that there was a problem that the steering angle of the wheel was limited by the interference from the upper arm or the steering knuckle.

The matters described above as the technical background are intended only for a better understanding of the background of the present invention and should not be taken as an acknowledgment that they pertain to the conventional art already known to those skilled in the art.

BRIEF SUMMARY OF THE INVENTION

The present invention is proposed to solve the problem described above and an object of the present invention is to mount a steering device in an independent drive wheel, mount the steering device at the same angle as the kingpin angle and eccentric with respect to the kingpin angle while avoiding an interference from an upper arm and a steering knuckle to steer the wheel, and steer each wheel, thereby enabling not only turning during a straight driving but turning in a stationary state or sideways driving.

A steering device of an independent drive wheel according to the present invention includes a base frame coupled to a vehicle body; a drive device coupled to the base frame and driven to rotate an output shaft; a steering knuckle connecting the base frame and the wheel through an upper arm and a lower arm vertically spaced apart from each other; and a connecting device having one end connected to the output shaft of the drive device and the other end, which extends in the longitudinal direction, connected to a steering knuckle below the upper arm to transmit a driving force of a drive device to rotate the steering knuckle in the same direction as the extending longitudinal direction.

The connecting device is connected to the steering knuckle or the output shaft of the drive device in a state of being spaced apart from the steering knuckle in a direction traversing the longitudinal direction in which the connecting device extends.

The connecting device includes a first coupling portion coupled to the output shaft of the drive device to extend in a direction traversing the extending direction of the connecting device; an extending portion having one end coupled to the first coupling portion rotatably in a direction traversing the longitudinal direction and configured to extend to the wheel side; and a second coupling portion coupled to the other end of the extending portion rotatably in a direction traversing the longitudinal direction of the extending portion and coupled to the steering knuckle, spaced apart from the steering knuckle in a direction traversing the longitudinal direction of the extending portion.

The connecting device is allowed displacement in the longitudinal direction but is prevented from axially rotating with respect to the longitudinal direction.

The connecting device includes a cylinder extending in the longitudinal direction at one end and a rod extending in the longitudinal direction at the other end to be inserted into the cylinder and moving in the longitudinal direction.

A protrusion protruding outward from an outer surface is formed in the rod, and a groove into which the protrusion is inserted is formed at a position corresponding to the protrusion on an inner surface of the cylinder.

The connecting device further includes a bearing positioned on a contact surface between the cylinder and the rod to move together with the movement of the rod.

A damping device absorbing vibrations or shocks in the longitudinal direction is further included inside the connecting device.

The steering knuckle includes a first knuckle arm extending from the wheel side to be connected to the lower arm and a second knuckle arm that is vertically spaced apart from the first knuckle arm and extends from the wheel side to be connected to the upper arm.

The other end of the connecting device is connected to the first knuckle arm, the second knuckle arm is provided with a through-groove through which the connecting device passes, and the connecting device rotates inside the through-groove according to the operation of the drive device.

The connecting device is spaced apart from, and extends in the same direction as an extension line obtained by extending an end of the first knuckle arm and an end of the second knuckle arm.

The steering knuckle is connected to the lower arm and the upper arm by a ball joint.

An independent drive module including the steering device of the independent drive wheel according to the present invention includes a base frame coupled to a vehicle body; a drive device coupled to the base frame and driven to rotate an output shaft; a lower arm having one end coupled to the base frame and driven to rotate an output shaft; an upper arm having one end connected to the base frame, vertically spaced apart from the lower arm; a steering knuckle connected to the upper arm and the lower arm vertically spaced apart from each other to connect the base frame and a wheel; and a connecting device having one end connected to the output shaft of the drive device and the other end, which extends in the longitudinal direction, connected to the steering knuckle below the upper arm to transmit the driving force of a drive device to rotate the steering knuckle in the same direction as the extending longitudinal direction.

A shock absorber having one end rotatably connected to the lower arm and the other end rotatably connected to the base frame is further included.

One end of the lower arm is vertically coupled to the base frame rotatably, and one end of the upper arm is vertically coupled to the base frame rotatably.

The steering device of the independent drive wheel according to the present invention is mounted on each independent drive wheel and steers the driving direction of each wheel to have an effect of allowing the vehicle to turn in place or drive sideways.

In addition, the connecting device is formed to be eccentric in the same angle as the kingpin angle and transmit the rotation of the drive device so that there is an effect of minimizing the output of the drive device.

In addition, the connecting device is formed to be eccentric with respect to the kingpin shaft to avoid interference from the upper arm and the steering knuckle so that there is an effect that various steering angles of the wheel may be formed.

BRIEF DESCRIPTION OF THE DRAWINGS

FIGS. 5(A), 5(B) and 5(C) are perspective views showing steering states of a wheel of a steering device of an independent drive wheel according to an embodiment of the present invention.

DETAILED DESCRIPTION OF THE INVENTION

Figure 1:
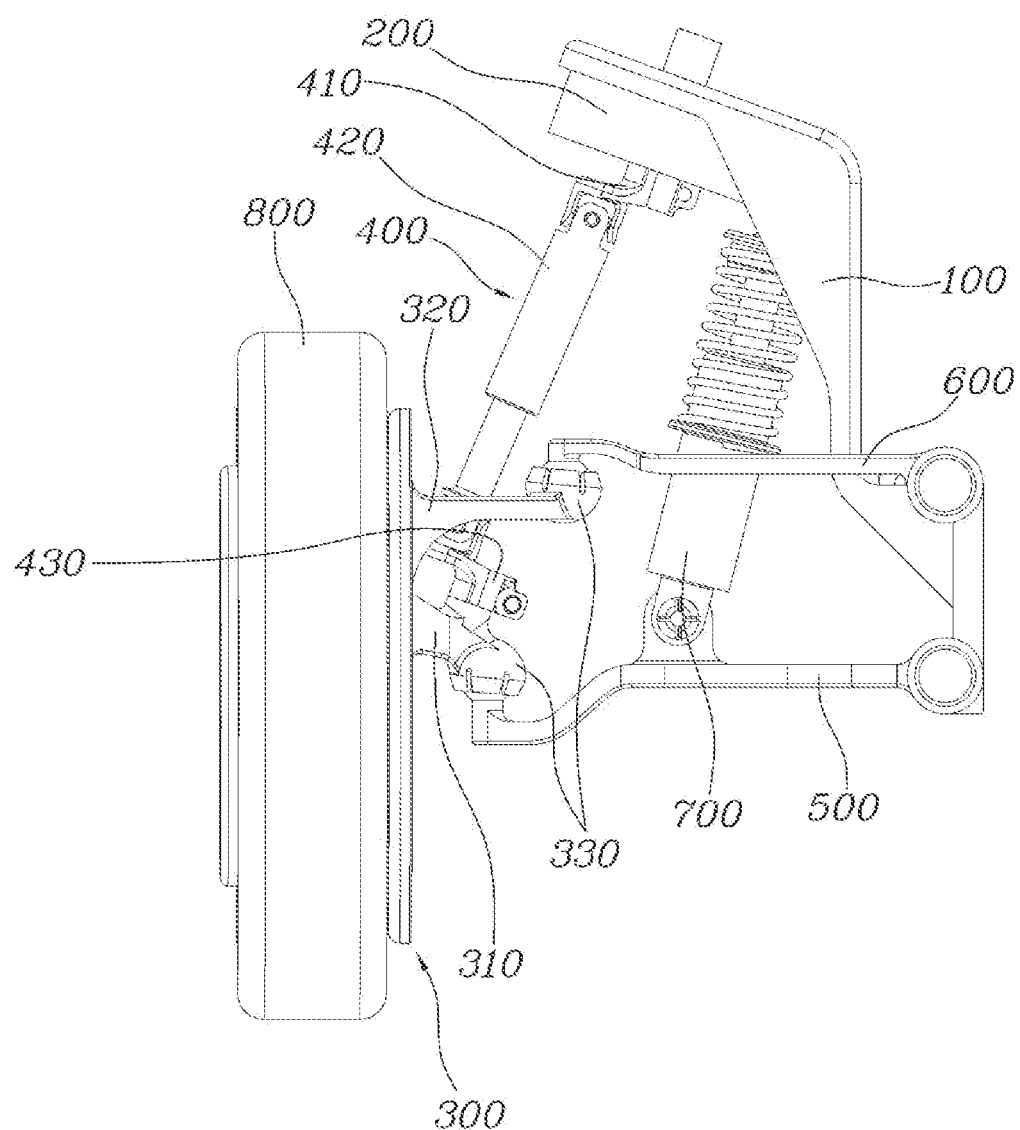
FIG. 1 is a perspective view showing a steering device of an independent driving wheel according to an embodiment of the present invention.

Specific structural or functional descriptions of the embodiments of the present invention disclosed in the present specification or application are presented by, way of examples only for the purpose of describing the embodiments according to the present invention, and the embodiments according to the present invention may be implemented in various forms and should not be construed as being limited to the embodiments described in the present specification or application.

Since the embodiment of the present invention may be modified in various ways and have various forms, specific embodiments will be illustrated in the drawings and described in the present specification or application. However, this is not intended to limit the embodiments according to the concept of the present invention to the specific forms and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the other component, but it should be understood that other components may exist in between. On the other hand, when a component is referred to as being "directly connected" or "directly coupled" to another component, it should be understood that there are no intervening components present. Other expressions describing the relationship between components such as "between" and "just between", or "adjacent to" and "directly adjacent to" should be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and should not be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, should be interpreted as having a meaning that is consistent with their meaning in the context of the present specification, and will not be interpreted in an idealized or overly formal sense unless expressly so defined herein.

In the following, the present invention will be described in detail by describing preferred embodiments of the present invention with reference to the accompanying drawings.

Preferred embodiments of a steering device 1000 of an independent drive wheel 800 according to the present invention will be described with reference to the accompanying FIGS. 1 to 9.

The independent drive wheel 800 is provided with a drive device mounted inside the wheel 800 to be able to rotate the wheel 800. The steering device 1000 of the independent drive wheel 800 according to the present invention is a steering device 1000 steering a turning direction of a vehicle when the independent drive wheel 800 is driven.

Figure 2:
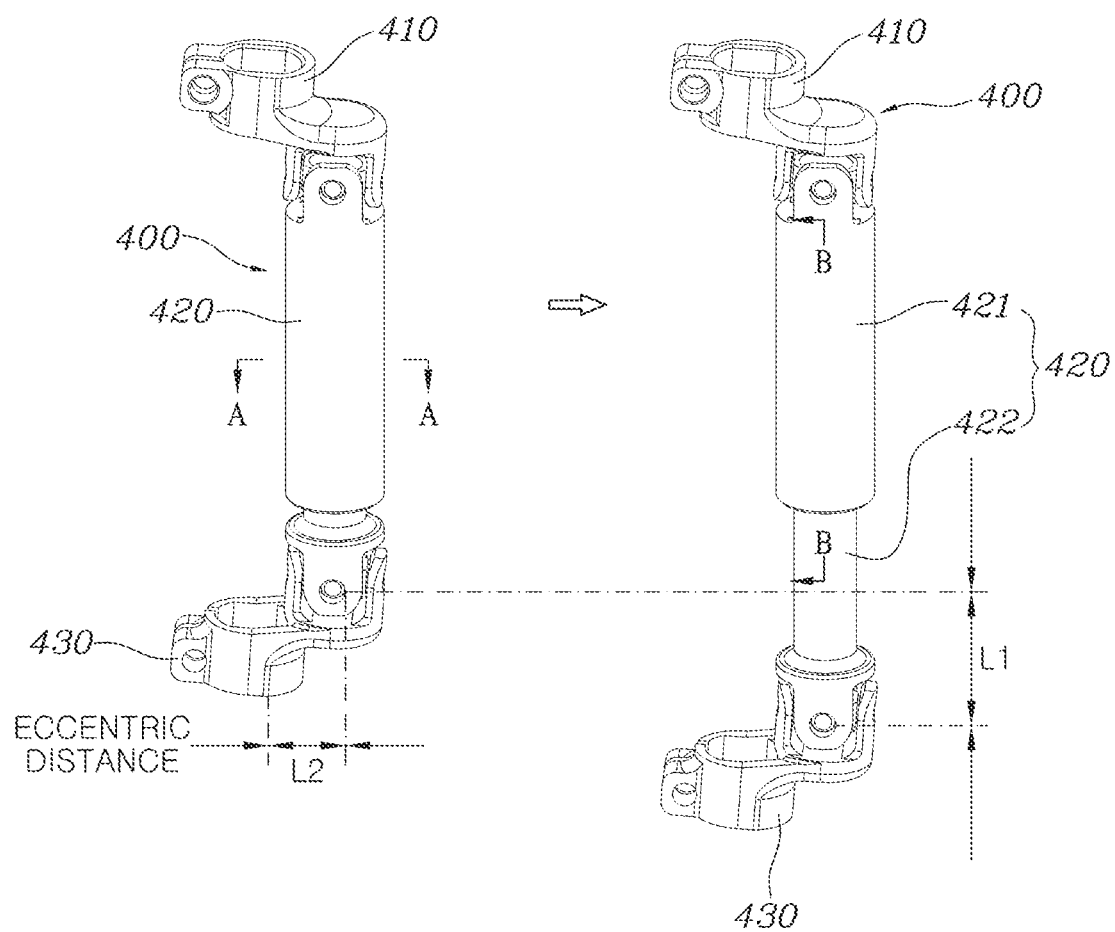
FIG. 2 is a perspective view showing a length change of a connecting device of a steering device of an independent drive wheel according to an embodiment of the present invention.
Figure 3:
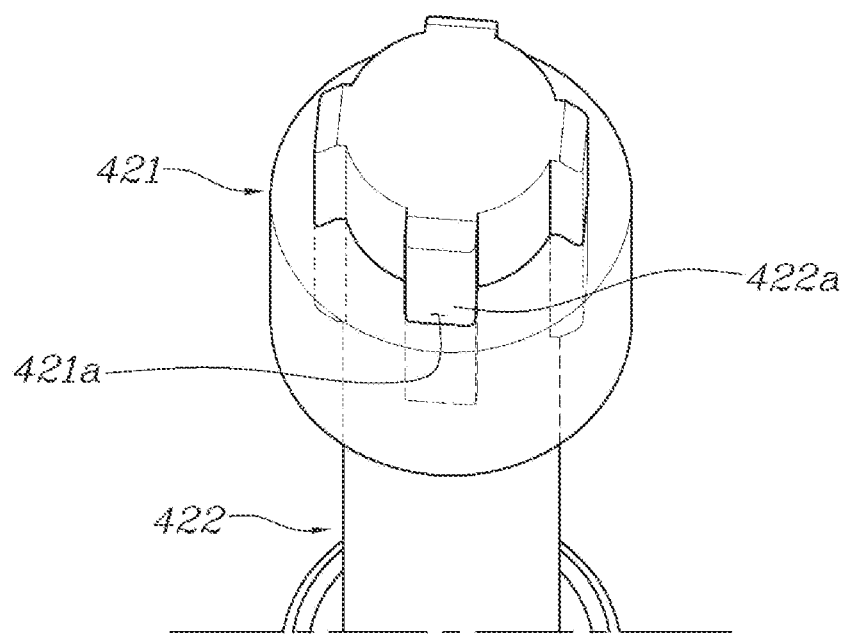
FIG. 3 is a cross-sectional view taken along A-A in FIG. 2.
Figure 4:
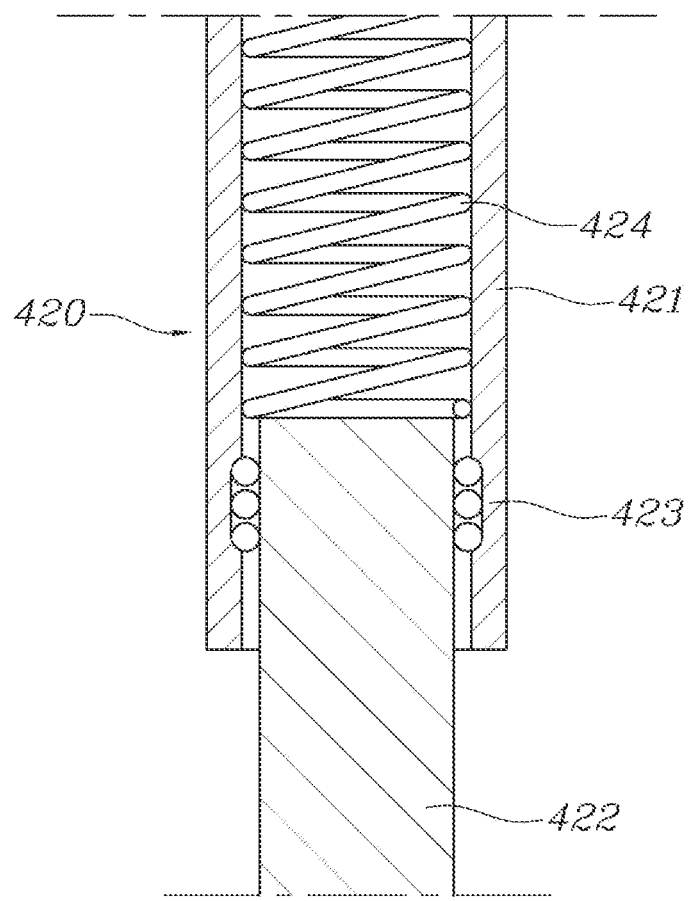
FIG. 4 is longitudinal view taken along B-B in FIG. 2.

FIG. 1 is a perspective view of the steering device 1000 of the independent drive wheel 800 according to an embodiment of the present invention, FIG. 2 is a perspective view showing a length change of a connecting device 400 of a steering device 1000 of an independent drive wheel 800 according to an embodiment of the present invention, FIG. 3 is a cross-sectional view taken along A-A in FIG. 2, and FIG. 4 is a longitudinal view taken along B-B in FIG. 2.

The steering device 1000 of an independent drive wheel 800 according to the present invention includes a base frame 100 coupled to a vehicle body; a drive device 200 coupled to the base frame 100 and driven to rotate an output shaft; a steering knuckle 300 connecting the base frame 100 and the wheel 800 through an upper arm 600 and a lower arm 500 vertically spaced apart from each other; and a connecting device 400 having one end connected to the output shaft of the drive device 200 and the other end, which extends in the longitudinal direction, connected to a steering knuckle 300 below the upper arm 600 to transmit a driving force of a drive device 200 to rotate the steering knuckle 300 in the same angle as the extending longitudinal direction.

As shown in FIG. 1, the base frame 100 may be coupled to the vehicle body and may extend from the vehicle body side upward of the wheel 800. At one end of the base frame 100, the lower arm 500 extending in the longitudinal direction of the vehicle to be coupled thereto may be positioned, and the upper arm 600 extending in the longitudinal direction of the vehicle to be coupled to the base frame 100, vertically spaced apart from the lower arm 500, may be positioned. The lower arm 500 and the upper arm 600 may be connected to the steering knuckle 300 connected to the wheel 800, thereby connecting the vehicle body and the wheel 800.

At the other end of the base frame 100, the drive device 200 driven to rotate the output shaft may be mounted and the connecting device 400 connecting the output shaft of the drive device 200 and the knuckle arms 310, 320 to rotate the steering knuckle 300 according to the rotation of the drive device 200 may be formed. The connecting device 400 may be rotated according to the rotation of the drive device 200 and may rotate the steering knuckle 300 around a connecting portion to which the steering knuckle 300, the lower arm 500, and the upper 600 are connected. When the connecting device 400 is rotated by the driving of the drive device 200, the connecting device 400 may rotate the steering knuckle 300 by transmitting the driving force of the drive device 200 to the steering knuckle 300 while avoiding the interference from the upper arm 600 or the lower arm 500.

The connecting device 400 may be connected to the steering knuckle 300 or the output shaft of the drive device 200 in a state of being spaced apart from the steering knuckle in a direction traversing the direction in which the connecting device 400 extends.

The steering device 1000 of the independent drive wheel 800 according to the present invention may be individually mounted on each wheel 800 of the vehicle, and steering the respective wheel 800 has the effect of allowing the vehicle to turn at a greater angle than the conventional vehicle, turn in place, or drive sideways.

The connecting device 400 includes a first coupling portion 410 coupled to the output shaft of the drive device 200 and configured to extend in a direction traversing the extending direction of the connecting device 400; an extending portion 420 having one end coupled to the first coupling portion 410 rotatably in a direction traversing the longitudinal direction and configured to extend to the wheel 800 side; and a second coupling portion 430 coupled to the other end of the extending portion 420 rotatably in a direction traversing the longitudinal direction of the extending portion 420 and coupled to the steering knuckle 300, spaced apart from the steering knuckle in a direction traversing the longitudinal direction of the extending portion 420.

As shown in FIGS. 1 and 2, the first coupling portion 410 may have one end coupled to the output shaft of the drive device 200 and configured to extend in a direction traversing the extending direction of the output shaft of the drive device 200 to rotate according to the rotation of the output shaft. The extending portion 420 may have one end coupled to the other end of the first coupling portion 410 rotatably in a direction traversing the longitudinal direction of the extending portion 420 and have the other end capable of extending toward the wheel 800 to have a variable length.

The second coupling portion 430 may have one end coupled to the other end of the extending portion 420 rotatably in a direction traversing the longitudinal direction of the extending portion 420 and the other end extending in a direction traversing the longitudinal direction of the extending portion 420 to be coupled to the steering knuckle 300.

This has the effect of rotating the steering knuckle 300 while avoiding the interference from the lower arm 500 or the upper arm 600 when the connecting device 400 is rotated by the driving of the drive device 200 as the connecting device 400 is spaced apart from the steering knuckle in a direction traversing the extending direction of the output shaft of the drive device 200 and extends to the steering knuckle 300 side to be coupled to the same.

The connecting device 400 is allowed displacement L1 in the longitudinal direction but is prevented from axially rotating with respect to the longitudinal direction.

As shown in FIGS. 1 and 2, the connecting portion 400 may have a variable length and be prevented from axially rotating with respect to the longitudinal direction.

This has the effect that the connecting device 400 may rotate while avoiding the interference from the upper arm 600 when the connecting device 400 is rotated by the drive device 200.

The connecting device 400 includes a cylinder 421 extending in the longitudinal direction at one end and a rod 422 extending in the longitudinal direction to be inserted into the cylinder 421 and moving in the longitudinal direction at the other end.

As shown in FIG. 2, the extending portion 420 of the connecting device 400 may include the cylinder 421 and the rod 422 inserted into the longitudinally extending cylinder 421 such that the length of the connecting device 400 may vary.

This has the effect of avoiding the interference from the upper arm 600 or the lower arm 500 as the rod 422 inserted into the cylinder 421 moves for the extending portion 420 to vary longitudinally, and thus, the length of the connecting device 400 varies during rotation.

A protrusion 422a protruding outward from an outer surface is formed in the rod 422, and a groove 421a into which the protrusion 422a is inserted is formed at a position corresponding to the protrusion 422a on an inner surface of the cylinder 421.

As shown in FIG. 3, the protrusion 422a protruding outward is formed on the outer surface of the rod 422, and a groove 421a into which the protrusion 422a is inserted is formed at a position corresponding to the protrusion 422a in the cylinder 421.

This has the effect of preventing the rod 422 from axially rotating with respect to the longitudinal direction and transmitting the rotational force of the drive device 200 to the steering knuckle 300 as the length of the connecting device 400 varies.

The connecting device 400 further includes a bearing 423 positioned on a contact surface between the cylinder 421 and the rod 422 to move together with the movement of the rod 422.

As shown in FIG. 4, the bearing 423 is positioned on a surface where the cylinder 421 and rod 422 contact with each other so that the bearing 423 may also move when the rod 422 moves.

This has the effect of reducing the frictional force of the contact surface between the cylinder 421 and the rod 422, and applying grease to the contact surface instead of the bearing 423 may reduce the friction.

A damping device 424 absorbing vibrations or shocks in the longitudinal direction is further included inside the connecting device 400.

As shown in FIG. 4, the damping device 424 such as a fluid or an elastic body may be formed inside the cylinder 421 to absorb shocks or vibrations transmitted from the road surface to the connecting device 400 through the wheel 800.

This has the effect of increasing the lifetime of the connecting device 400 and the lifetime of the drive device 200 as the damping device 424 absorbs shocks or vibrations.

The steering knuckle 300 includes the first knuckle arm 310 extending from the wheel 800 side to be connected to the lower arm 500 and the second knuckle arm 320 that is vertically spaced apart from the first knuckle arm 310 and extends from the wheel 800 side to be connected to the upper arm 600.

The first knuckle arm 310 extends from the wheel 800 side to the base frame 100 side for the end thereof to be connected to the lower arm 500, and the second knuckle arm 320 is vertically spaced apart from the first knuckle arm 310 and extends to the base frame 100 side to be connected to the upper arm 600.

This allows the steering knuckle 300 connected to the wheel 800 to be connected to the lower arm 500 and the upper arm 600 so that the wheel 800 may be connected to the vehicle body.

The other end of the connecting device 400 is connected to the first knuckle arm 310, a through-groove 321 through which the connecting device 400 passes is formed in the second knuckle arm 320, and the connecting device 400 rotates inside the connecting groove according to the operation of the drive device 200.

The second coupling portion 430 positioned at the other end of the connecting device may be connected to the first knuckle arm 310 and be positioned above the upper arm 600.

The connecting device 400 may extend passing through the through-groove 321 passing through the second knuckle arm 320 to be connected to the first knuckle arm 310, and the connecting device 400 may freely rotate without contacting with the second knuckle arm 320 while rotating inside the through-groove 321.

This allows the connecting device 400 to be connected to the first knuckle arm 310 of the steering knuckle 300 while the steering knuckle 300 is connected to the lower arm 500 and the upper arm 600.

The connecting device 400 is spaced from, and extends in the same angle as the extension line obtained by extending an end of the first knuckle arm 310 and an end of the second knuckle arm 320.

The extending portion 420 of the connecting device 400 may be spaced apart by the first coupling portion 410 and the second coupling portion 430 in a direction traversing the longitudinal direction, and the extending portion 420 may be formed to be eccentric in the same angle as the extension line obtained by extending an end of the first knuckle arm 310 and an end of the second knuckle arm 320. In addition, there is the effect of maintaining the eccentric distance L2 as the length of the extending portion 420 varies.

The steering knuckle 300 is connected to the lower arm 500 and the upper arm 600 by a ball joint 330.

The first knuckle arm 310 of the steering knuckle 300 is connected to the lower arm 500 by the ball joint 330 to be rotatable in all directions, and the second knuckle arm 320 is connected to the upper arm 600 by the ball joint 330 to be rotatable in all directions.

This has the effect of allowing the steering knuckle 300 connected to the upper arm 600 and the lower arm 500 to rotate freely as the connecting device 400 rotates.

An independent drive module including the steering device 1000 of the independent drive wheel 800 according to the present invention includes a base frame 100 coupled to a vehicle body; a drive device 200 coupled to the base frame 100 and driven to rotate an output shaft; a lower arm 500 having one end connected to the base frame 100; an upper arm 600 having one end connected to the base frame 100, vertically spaced apart from the lower arm 500; a steering knuckle 300 connected to the upper arm 600 and the lower arm 500 vertically spaced apart from each other to connect the base frame 100 and a wheel 800; and a connecting device 400 having one end connected to the output shaft of the drive device 200 and the other end, which extends in the longitudinal direction, connected to the steering knuckle 300 below the upper arm 600 to transmit the driving force of the drive device 200 to rotate the steering knuckle 300 the same direction as the extending longitudinal direction.

A shock absorber 700 having one end rotatably connected to the lower arm 500 and the other end rotatably connected to the base frame 100 is further included.

The shock absorber 700 has one end extending in the longitudinal direction to be rotatably connected to the lower arm 500 and the other end rotatably connected to the base frame 100, is injected with a fluid-like liquid material inside, is wrapped with an elastic body outside, may contract or stretch in the longitudinal direction through a fluid and an elastic body, and thus, may absorb vibrations generated on the road surface.

Accordingly, the shock absorber 700 has the effect of improving the riding comfort of passengers.

One end of the lower arm 500 is vertically coupled to the base frame 100 rotatably, and one end of the upper arm 600 is vertically coupled to the base frame 100 rotatably.

One end of the lower arm 500 may be vertically coupled to the base frame 100 rotatably and one end of the upper arm 600 may be vertically coupled to the base frame 100 so that the lower arm 500 and the upper arm 600 may move vertically according as the shock absorber 700 stretches or contracts.

This has the effect of improving the riding comfort of the vehicle as the upper arm 600 and the lower arm 500 vertically rotate around the respective end when the shock absorber 700 absorbs vibrations or shocks from the road surface.

Figure 6:
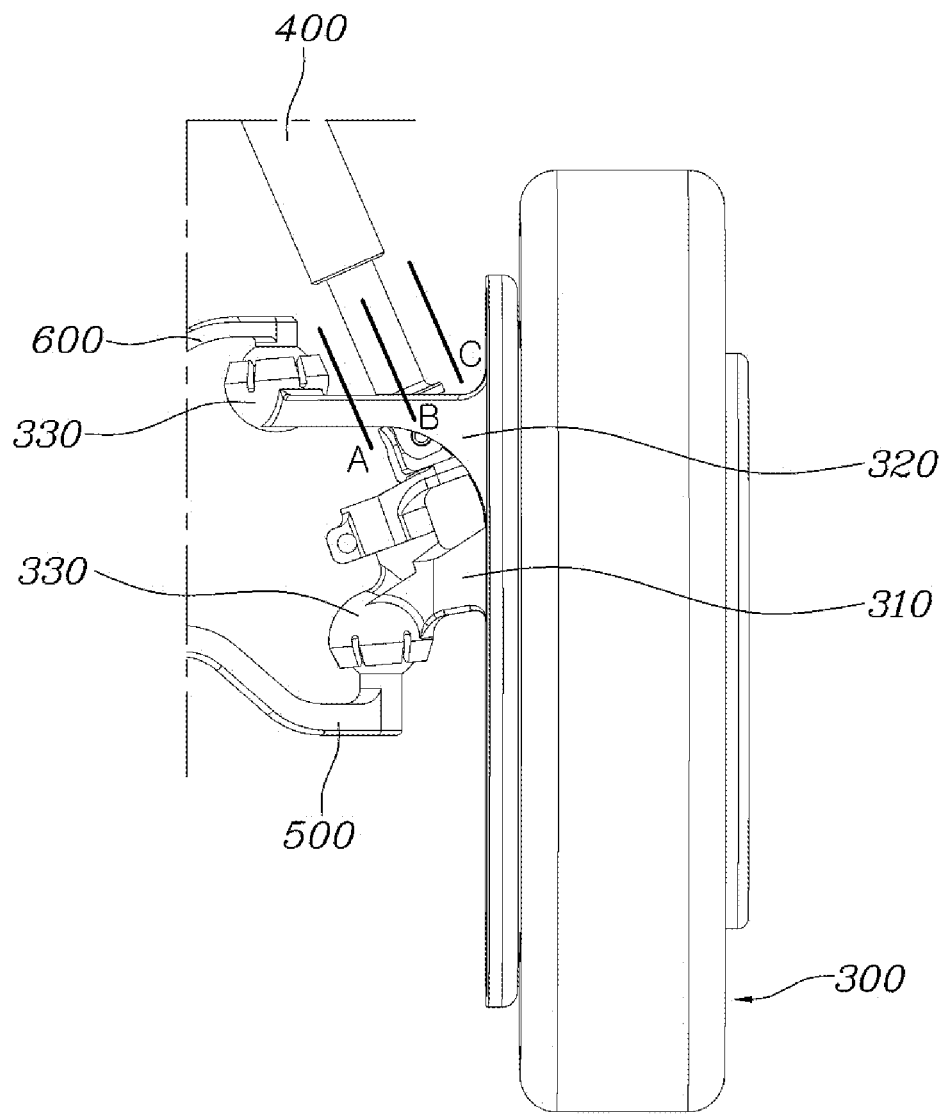
FIG. 6 is a view showing an eccentric distance of a connecting device of a steering device of an independent drive wheel according to an embodiment of the present invention.
Figure 7:
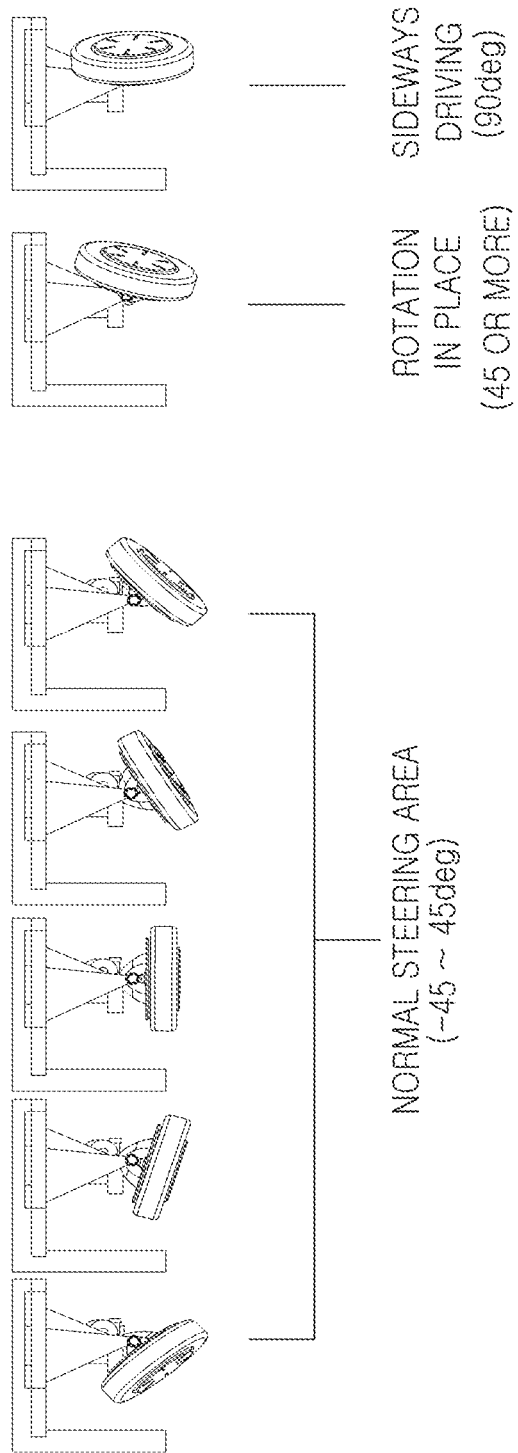
FIG. 7 is a plan view showing a steering angle of a wheel of a steering device of an independent drive wheel according to an embodiment of the present invention.
Figure 8:
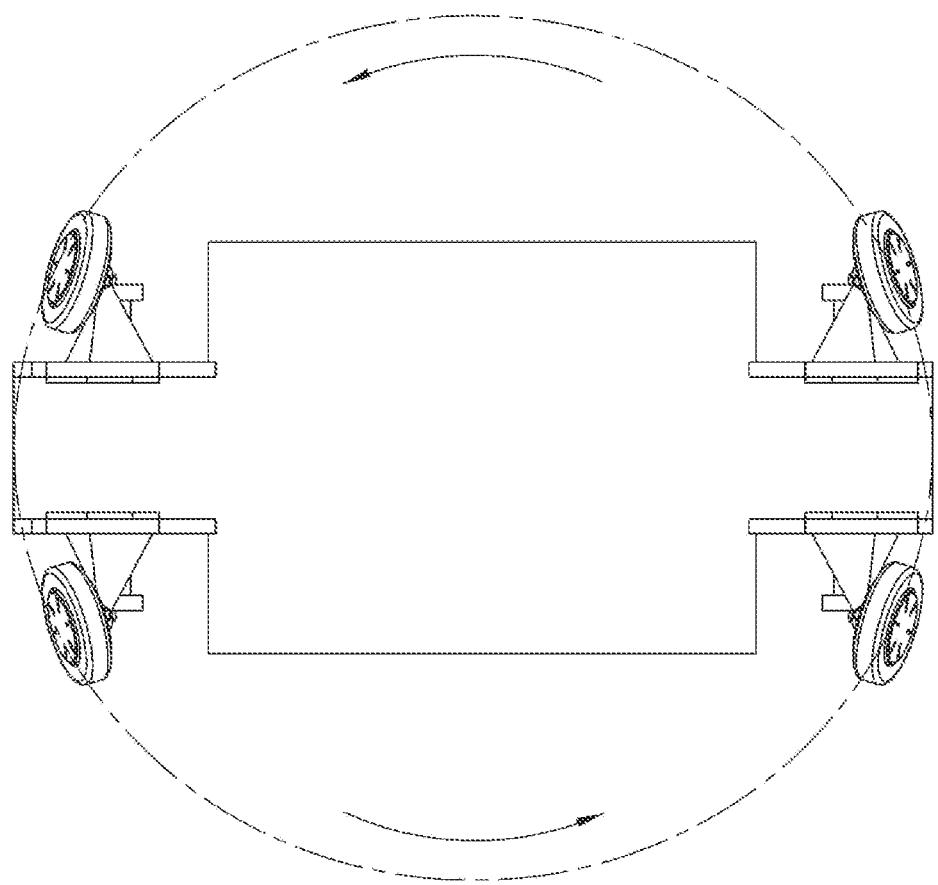
FIG. 8 is a plan view showing rotational driving in place of a steering device of an independent drive wheel according to an embodiment of the present invention.
Figure 9:
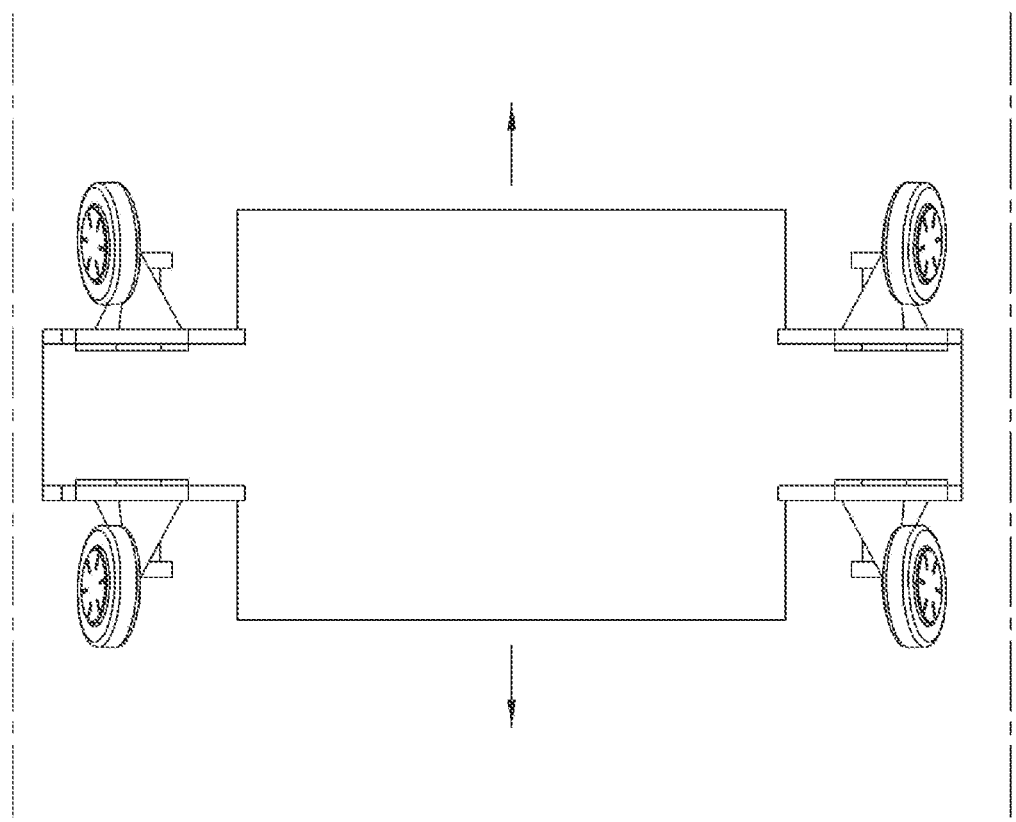
FIG. 9 is a plan view showing sideways driving of a steering device of an independent drive wheel according to an embodiment of the present invention.
Figure 10:
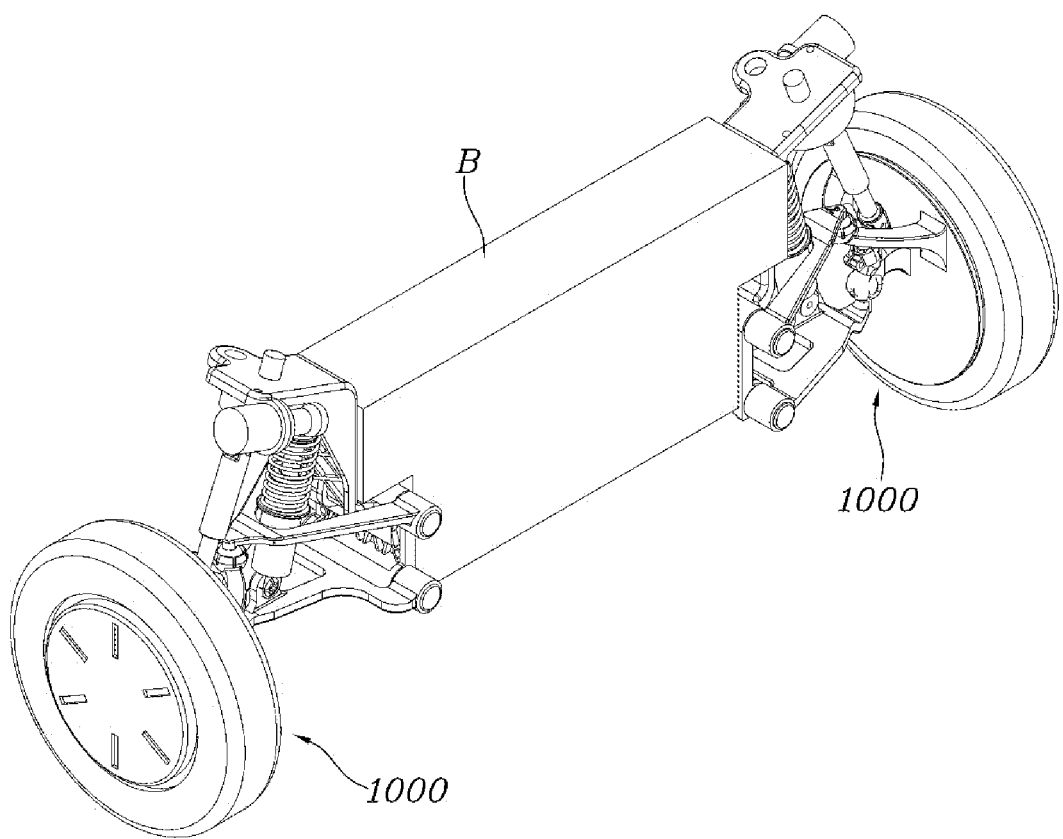
FIG. 10 is a perspective view showing an independent drive module coupled to a battery module according to an embodiment of the present invention.

Meanwhile, reference signs "A", "B" and "C" and lines thereof as displayed in FIG. 6 denote virtual rotated positions of the connecting device 400, and reference sign "B" as displayed in FIG. 10 denotes a battery module.

Specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A steering device of an independent drive wheel, comprising:
 a base frame coupled to a vehicle body;
 a drive device coupled to the base frame and configured to rotate an output shaft;
 upper and lower arms coupled to the vehicle body and vertically spaced apart from each other;
 a steering knuckle coupled directly to the upper and lower arms and configured to attach the independent drive wheel to the base frame through the upper and lower arms; and
 a connecting device having a first end connected to the output shaft and a second end connected directly to the steering knuckle, the second end of the connecting device configured to transmit a driving force from the drive device to rotate the steering knuckle in a longitudinal direction of the connecting device.

2. The steering device of claim 1, wherein the connecting device is connected to the steering knuckle or the output shaft of the drive device and spaced apart from the steering knuckle in a direction traversing the longitudinal direction of the connecting device.

3. The steering device of claim 1, wherein the connecting device is configured such that a displacement of the connecting device in the longitudinal direction thereof is allowed but an axial rotation of the connecting device with respect to the longitudinal direction thereof is prevented.

4. The steering device of claim 1, wherein the connecting device having a first end including a cylinder extending in the longitudinal direction of the connecting device and a second end including a rod extending in the longitudinal direction of the connecting device, inserted into the cylinder and moving in the longitudinal direction of the connecting device.

5. The steering device of claim 4, wherein:
 the rod includes a protrusion protruding outward from an outer surface of the rod, and
 the cylinder has a groove configured to engage the protrusion located corresponding to a location of the protrusion of the cylinder.

6. The steering device of claim 4, wherein the connecting device further includes a bearing positioned on a contact surface between the cylinder and the rod and configured to move together with the rod.

7. The steering device of claim 1, wherein the connecting device further includes a damping device configured to absorb vibrations or shocks in the longitudinal direction.

8. The steering device of claim 1, wherein the steering knuckle includes:
 a first knuckle arm extending from the independent drive wheel and connected to the lower arm; and
 a second knuckle arm vertically spaced apart from the first knuckle arm, extending from the independent drive wheel and connected to the upper arm.

9. The steering device of claim 8, wherein:
 the second end of the connecting device is connected to the first knuckle arm,
 the second knuckle arm has a through-groove passing through the connecting device, and
 the connecting device is configured to rotate within a connecting groove according to rotating of the output shaft.

10. The steering device of claim 8, wherein the connecting device is spaced apart from and extends in a direction of a line extending between an end of the first knuckle arm and an end of the second knuckle arm.

11. The steering device of claim 1, wherein the steering knuckle is connected to the lower arm and the upper arm by a ball joint.

12. A steering device of an independent drive wheel, comprising:
 a base frame coupled to a vehicle body;
 a drive device coupled to the base frame and configured to rotate an output shaft;
 a steering knuckle connecting the base frame and the independent drive wheel through an upper arm and a lower arm vertically spaced apart from each other; and
 a connecting device having a first end connected to the output shaft and a second end extending in a longitudinal direction of the connecting device, wherein the second end of the connecting device is connected to the steering knuckle and configured to transmit a driving force from the drive device to rotate the steering knuckle in the longitudinal direction of the connecting device,
 wherein the connecting device includes:
 a first coupling portion coupled to the output shaft of the drive device and extending in a direction traversing the longitudinal direction of the connecting device;
 an extending portion having a first end rotatably coupled to the first coupling portion in a direction crossing the longitudinal direction of the connecting device and extending to the independent drive wheel; and
 a second coupling portion rotatably coupled to a second end of the extending portion in a direction traversing a longitudinal direction of the extending portion, coupled to the steering knuckle, and spaced apart from the steering knuckle in a direction traversing the longitudinal direction of the extending portion.

13. An independent drive module including a steering device of an independent drive wheel, the independent drive module comprising:
 a base frame connected to a vehicle body;
 a drive device connected to the base frame and configured to rotate an output shaft;
 a lower arm having an end connected to the base frame;
 an upper arm having an end connected to the base frame and vertically spaced apart from the lower arm;
 a steering knuckle connected directly to the upper and lower arms and configured to attach the independent drive wheel to the base frame through the upper and lower arms; and a connecting device having a first end connected to the output shaft and a second end extending in a longitudinal direction of the connecting device, wherein the second end of the connecting device is connected directly to the steering knuckle and configured to transmit a driving force from the drive device to rotate the steering knuckle in the longitudinal direction of the connecting device.

14. The independent drive module of claim 13, comprising a shock absorber having a first end rotatably connected to the lower arm and a second end rotatably connected to the base frame.

15. The independent drive module of claim 13, wherein the end of the lower arm is rotatably coupled to the base frame.

* * * * *